United States Patent
Yuan et al.

(10) Patent No.: US 7,054,387 B2
(45) Date of Patent: May 30, 2006

(54) FEED-FORWARD/FEEDBACK SYSTEM AND METHOD FOR NON-CAUSAL CHANNEL EQUALIZATION

(75) Inventors: Warm Shaw Yuan, San Diego, CA (US); Keith Michael Conroy, Salem, NH (US); Daniel M. Castagnozzi, Lexington, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 815 days.

(21) Appl. No.: 10/262,334

(22) Filed: Oct. 1, 2002

(65) Prior Publication Data

US 2003/0108124 A1 Jun. 12, 2003

Related U.S. Application Data

(63) Continuation-in-part of application No. 10/193,961, filed on Jul. 12, 2002, and a continuation-in-part of application No. 10/150,301, filed on May 17, 2002, and a continuation-in-part of application No. 10/077,332, filed on Feb. 15, 2002, now Pat. No. 6,915,464, and a continuation-in-part of application No. 10/077,274, filed on Feb. 15, 2002, and a continuation-in-part of application No. 10/066,966, filed on Feb. 4, 2002, now Pat. No. 6,961,390, and a continuation-in-part of application No. 10/020,426, filed on Dec. 7, 2001.

(51) Int. Cl.
*H04L 25/06* (2006.01)
*H04L 25/10* (2006.01)

(52) U.S. Cl. ...................... 375/317; 375/316; 375/329

(58) Field of Classification Search ................ 375/317, 375/316, 329
See application file for complete search history.

(56) References Cited

U.S. PATENT DOCUMENTS

| | | | | |
|---|---|---|---|---|
| 3,670,304 A | * | 6/1972 | Andresen et al. | 714/709 |
| 3,969,639 A | * | 7/1976 | Granberg et al. | 326/90 |
| 4,136,400 A | * | 1/1979 | Caswell et al. | 710/107 |
| 5,255,287 A | * | 10/1993 | Davies et al. | 375/287 |
| 5,781,588 A | * | 7/1998 | Abe et al. | 375/334 |
| 5,896,422 A | * | 4/1999 | Lu | 375/317 |

\* cited by examiner

*Primary Examiner*—Jean B. Corrielus
*Assistant Examiner*—Erin M. File
(74) *Attorney, Agent, or Firm*—Law Office of Gerald Maliszewski; Gerald Maliszewski

(57) ABSTRACT

A system and method are provided for feed-forward/feedback non-causal channel equalization in a communications system. The method comprises: receiving a non-return to zero (NRZ) data stream input; using three thresholds, estimating a first bit in the data stream; using two thresholds, determining a third bit value received subsequent to the first bit; comparing the first bit estimate to the third bit value; comparing the first bit estimate to a second bit value received prior to the first bit; and, in response to the comparisons, determining the value of the first bit. In some aspects of the method, the third bit value is determined in response to a prior third bit value determination. Determining a third bit value includes: distinguishing NRZ data stream inputs between fourth and fifth thresholds as a "0" if the prior third bit value was a "1", and as a "1" if the prior third bit value was a "0".

51 Claims, 10 Drawing Sheets

INPUT LEVEL

V1 | DEFINITE "1"
---
"0" IF BOTH PAST & FUTURE BIT VALUES = "1"
"1" OTHERWISE

Vopt
---
"1" IF BOTH PAST & FUTURE BIT VALUES = "0"
"0" OTHERWISE

V0 | DEFINITE "0"

---

V1' | DEFINITE "1"
---
"0" IF PRIOR 3rd BIT VALUE WAS "1"
"1" IF PRIOR 3rd BIT VALUE WAS "0"

V0' | DEFINITE "0"

FIG. 5

FEED-FORWARD/FEEDBACK SYSTEM AND METHOD FOR NON-CAUSAL CHANNEL EQUALIZATION

RELATED APPLICATIONS

This application is a continuation-in-part of a pending application entitled, SYSTEM AND METHOD FOR NON-CAUSAL CHANNEL EQUALIZATION, invented by Castagnozzi et al., Ser. No. 10/020426, filed Dec. 7, 2001.

This application is a continuation-in-part of a pending application entitled, SYSTEM AND METHOD FOR NON-CAUSAL CHANNEL EQUALIZATION IN AN ASYMMETRICAL NOISE ENVIRONMENT, invented by Yuan et al., Ser. No. 10/066,966, filed Feb. 4, 2002, now U.S. Pat. No. 6,961,390.

This application is a continuation-in-part of a pending application entitled, SYSTEM AND METHOD FOR NON-CAUSAL CHANNEL EQUALIZATION USING ERROR STATISTIC DRIVEN THRESHOLDS, invented by Castagnozzi et al., Ser. No. 10/077,332, filed Feb. 15, 2002, now U.S. Pat. No. 6,915,464.

This application is a continuation-in-part of a pending application entitled, SYSTEM AND METHOD FOR ADJUSTING A NON-RETURN TO ZERO DATA STREAM INPUT THRESHOLD, invented by Acikel et al., Ser. No. 10/077,274, filed Feb. 15, 2002.

This application is a continuation-in-part of a pending application entitled, SYSTEM AND METHOD FOR FIVE-LEVEL NON-CAUSAL CHANNEL EQUALIZATION, invented by Yuan et al, Ser. No. 10/150,301, filed May 17, 2002.

This application is a continuation-in-part of a pending application entitled, SYSTEM AND METHOD FOR TEMPORAL ANALYSIS OF SERAIL DATA, invented by Milton et al, Ser. No. 10/193,961, filed Jul. 12, 2002.

BACKGROUND OF THE INVENTION

1. Field of the Invention

This invention generally relates to digital communications and, more particularly, to a system and method for minimizing the effects of inter-symbol interference in a non-return to zero (NRZ) data channel.

2. Description of the Related Art

FIG. 1 is a diagram illustrating a signal recovered from a binary symmetric, non-dispersive channel in the presence of noise (prior art). Conventionally, the signal is filtered with a transfer function matched to the signaling waveform (in this case a one unit step) and thresholded at the voltage level most likely to yield the transmitted bit. To recover the transmitted information, a hard decision must be made on the value of the received bit.

As a function of the filtering process, and sometimes as a result of the transmission process, pulse spreading occurs. That is, the energy associated with a bit spreads to neighboring bits. For small degrees of spreading these effects of this can be limited to the nearest neighbors with modest degradation in performance.

Three basic types of pulse spreading exist. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one. For each of these cases the likelihood of error in determining a bit value can be minimized if a different thresholds are used for different bit combinations.

FIG. 2 is a diagram illustrating received waveforms that are distorted in response to the inter-symbol interference resulting from energy dispersion (prior art). The value at the output of the filter varies with each bit, and is essentially a random process, due to the non-deterministic nature of the information, and scrambling that is often used in the transmission of NRZ data streams. However, received bits can be characterized with probability density functions, as shown. Without knowledge of the neighboring bits, a single probability density function could be extracted that represents the random behavior of the input over all conditions and all sequences. However, conditional probability density functions can be defined for the three cases mentioned above. Namely, probability density functions can be defined for the cases where there are zero neighboring ones, only one neighboring one, and two neighboring ones.

If the bit value decision process could be made using the knowledge of the decision made on the preceding decoded bit, and with a measurement of a subsequent decoded bit, then the corresponding probability density function could be selected to make a more accurate decision on the current bit decision. However, the cost and accuracy of conventional analog-to-digital (A/D) conversion circuits make such a solution impractical.

The degree of dispersion exhibited by a channel, and hence the separation of the conditional probability density functions, varies in response to a number of fixed and variable factors. Effective dispersion mitigation techniques must therefore be easily optimized to the channel and somewhat adaptive to changes in the channel due to aging, temperature changes, reconfiguration, and other possible influences.

It would be advantageous if inter-symbol interference caused by energy dispersion in a received NRZ data channel could be minimized.

It would be advantageous if the bit decision thresholds could be modified to take account of the dispersed energy in the neighboring bits in the NRZ data stream.

It would be advantageous if bit value decisions could be made based upon the preceding and subsequent bit values.

SUMMARY OF THE INVENTION

Many communication channels exhibit temporal spreading of the signaling waveform when propagating over long distances or over non-linear media. This phenomenon is not effectively addressed by traditional linear equalization techniques due to the non-causal nature of the impairment. A method is presented to reduce the effects of pulse spreading on hard-decision error rate in communication systems affected by this problem. The method utilizes multiple decision thresholds for each data bit. Post-processing of the multiple decision data is employed to reduce the data to a single hard decision per bit. The multiple data thresholds are adjusted for optimal mitigation of the spreading effect.

The proposed approach to this problem is to perform multiple decisions on every bit with a threshold for each of the above-mentioned conditional probability density functions. The multiple decision data is stored for several bit times, to allow a calculation to be made on the succeeding bits. This calculation is then used to select the threshold most appropriate given the estimated neighbor values. The refined decision is output from the device and fed-forward to be used in processing of subsequent bits.

Accordingly, a method is provided for feed-forward/ feedback non-causal channel equalization in a communications system. The method comprises: receiving a non-return to zero (NRZ) data stream input; using three thresholds, estimating a first bit in the data stream; using two thresholds, determining a third bit value received subsequent to the first bit; comparing the first bit estimate to the third bit value; comparing the first bit estimate to a second bit value received prior to the first bit; and, in response to the comparisons, determining the value of the first bit. In some aspects of the method, the third bit value is determined in response to a prior third bit value determination.

The method further comprises: establishing a first threshold (V1) to distinguish a high probability "1" first bit estimate; establishing a second threshold (V0) to distinguish a high probability "0" first bit estimate; establishing a third threshold (Vopt) to distinguish first bit estimates between the first and second thresholds; establishing a fourth threshold (V1') to distinguish a high probability "1" third bit estimate; and, establishing a fifth threshold (V0') to distinguish a high probability "0" third bit estimate.

Distinguishing first bit estimates between the first and second thresholds includes: distinguishing NRZ data stream inputs below first threshold and above the third threshold as a "0" if both the second and third bits are "1" values, as a "1" if only one of the second and third bits is a "1" value, and as "1" if both the second and third bits are a "0" value; and, distinguishing NRZ data stream inputs above the second threshold and below the third threshold as a "1" if both the second and third bits are a "0" value, as a "0" if only one of the second and third values is a "0" value, and as a "0" if both the second and third bits are a "1" value.

Determining a third bit value includes: distinguishing NRZ data stream inputs below fourth threshold and above the fifth threshold as a "0" if the prior third bit value was a "1"; and, distinguishing NRZ data stream inputs below the fourth threshold and above the fifth threshold as a "1" if the prior third bit value was a "0".

In some aspects of the method, receiving a non-return to zero data stream includes receiving a non-return to zero data stream encoded with forward error correction (FEC). Then, the method further comprises: following the determination of the first bit values, FEC decoding the first bit values; and, using the FEC corrections of the first bit values to adjust the threshold values. Alternately, the method further comprises: tracking the NRZ data stream inputs when the second bit value equals the third bit value; maintaining long-term averages of the tracked NRZ data stream inputs; and, adjusting the first and second thresholds in response to the long-term averages.

Additional details of the above-described method, and a non-causal channel equalization communication system are provided below.

BRIEF DESCRIPTION OF THE DRAWINGS

FIG. 5 is truth table associated with the non-causal circuit of FIG. 3.

DETAILED DESCRIPTION OF THE PREFERRED EMBODIMENTS

Figure 1:
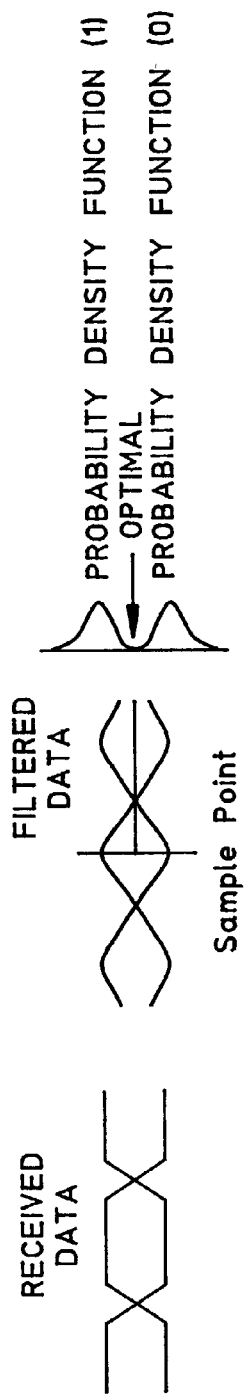
FIG. 1 is a diagram illustrating a signal recovered from a binary symmetric, non-dispersive channel in the presence of noise (prior art).
Figure 2:
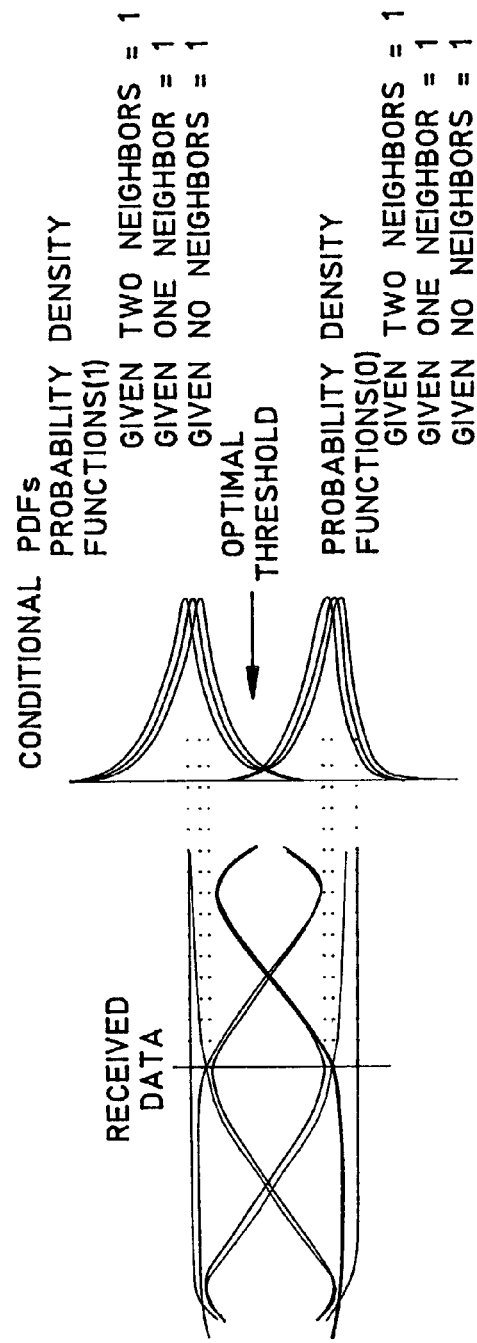
FIG. 2 is a diagram illustrating received waveforms that are distorted in response to the inter-symbol interference resulting from energy dispersion (prior art).
Figure 3:
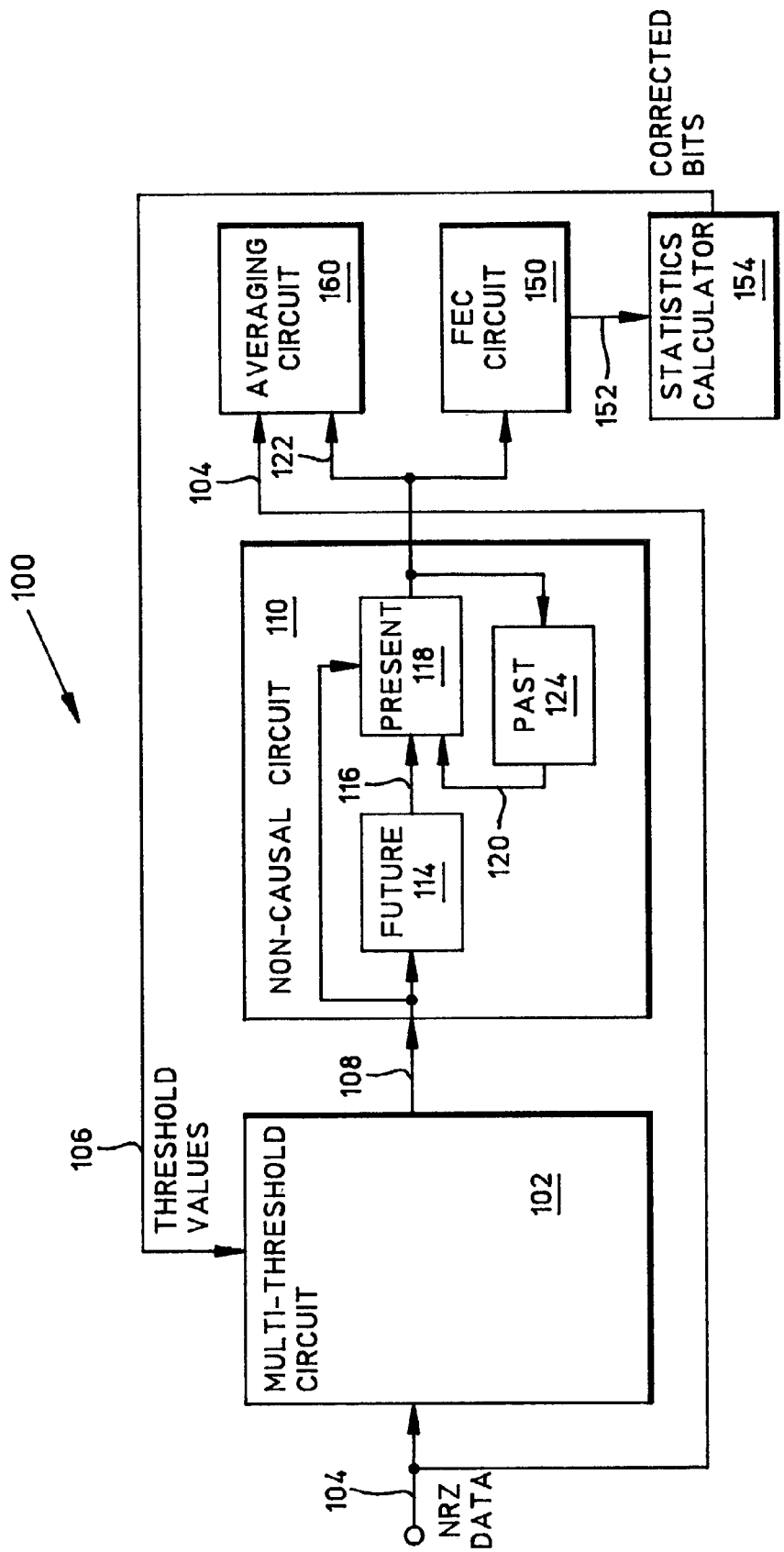
FIG. 3 is a schematic block diagram of the present invention feed-forward/feedback non-causal channel equalization communication system.

FIG. 3 is a schematic block diagram of the present invention feed-forward/feedback non-causal channel equalization communication system. The system 100 comprises a multi-threshold decision circuit 102 having an input on line 104 to accept a non-return to zero (NRZ) data stream, and an input on line 106 to accept threshold values. The multi-threshold decision circuit 102 has outputs on line 108 to provide bit estimates responsive to a plurality of voltage threshold levels.

A non-causal circuit 110 has inputs on line 108 to accept the bit estimates from the multi-threshold decision circuit 102. The non-causal circuit 110 compares a current bit estimate (a first bit) to bit values decisions made across a plurality of clock cycles. More specifically, the non-causal circuit 110 supplies a first bit value responsive to comparing first bit estimates to a third bit value, received subsequent to the first bit, and a second bit value received prior to the first bit. In addition, the third bit value is determined in response to a previously determined third bit value. The non-causal circuit 110 has an output to supply a bit value decision for the current bit estimate determined in response to the non-causal bit value comparisons.

The multi-threshold circuit 102 supplies third bit estimates on lines 108 in response to a second plurality of voltage threshold levels. The non-causal circuit 110 includes a future decision circuit 114 having inputs connected to the mutli-threshold circuit outputs 108 and an output on line 116 to supply a third bit value responsive to prior third bit value determinations. A present decision circuit 118 has inputs on line 108 to accept first bit estimates from the multi-threshold circuit 102, the third bit value on line 116 from the future decision circuit 114, and a second bit value on line 120. The present decision circuit 118 has an output on line 122 to supply the first bit value determined in response to comparing the first bit estimates to the second and third bit values. A past decision circuit 124 has an input on line 122 to accept the first bit value and an output on line 120 to supply the second bit value. The past decision circuit 124 acts as a one-clock cycle delay.

Figure 4:
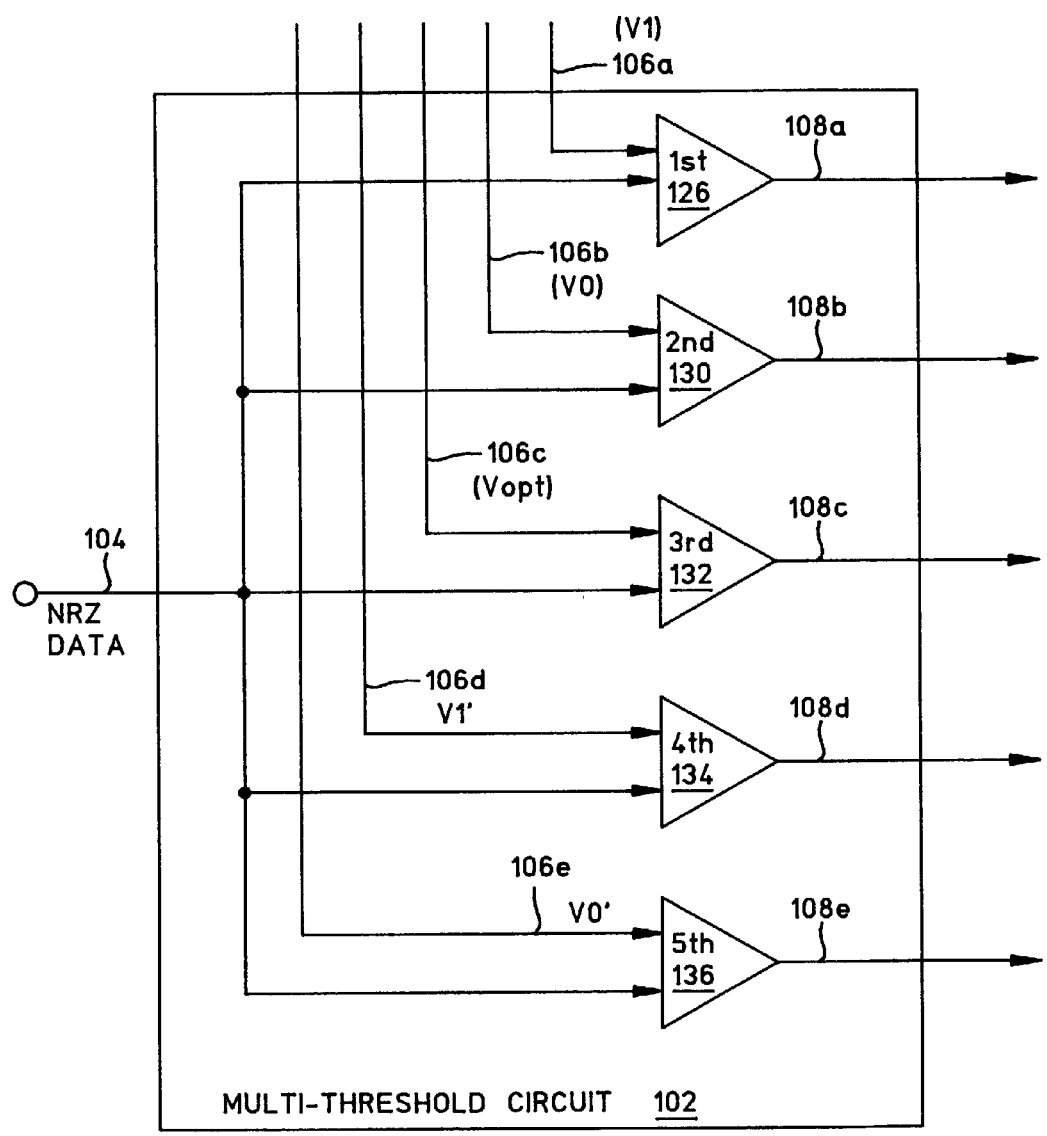
FIG. 4 is a detailed depiction of the multi-threshold decision circuit of FIG. 3.

FIG. 4 is a detailed depiction of the multi-threshold decision circuit 102 of FIG. 3. The multi-threshold circuit 102 includes a first comparator 126 having an input on line 104 to accept the NRZ data stream, an input on line 106a establishing a first threshold (V1), and an output on line 108a to supply a signal distinguishing when the NRZ data stream input has a high probability of being a "1" bit value estimate. A second comparator 130 has an input on line 104 to accept the NRZ data stream, an input on line 106b establishing a second threshold (V0), and an output on line 108b to supply a signal distinguishing when the NRZ data stream input has a high probability of being a "0" bit value estimate. A third comparator 132 has an input on line 104 to accept the NRZ data stream, an input on line 106c establishing a third threshold (Vopt), and an output on line 108c to provide a signal when the NRZ data stream input has an approximately equal probability of being a "0" value as a "1" value estimate.

Considering FIGS. 3 and 4, when the multi-threshold circuit 102 supplies a first bit estimate for an NRZ data stream input on line 104 below the third threshold on line 106c (Vopt) and above the second threshold on line 106b (V0), the present decision circuit 118, in response, supplies a first bit value of "1" on line 122 if both the second and third bit value are "0" values. If only one of the second and third bit values is a "0" value, or if both the second and third bit values are a "1, a first bit value of "0" is supplied. NRZ data above the first threshold is considered a definite "1", while data below the second threshold is considered a definite "0".

When the multi-threshold circuit 102 supplies a first bit estimate for an NRZ data stream input on line 104 above the third threshold on line 106c and below the first threshold on line 106a (V1), the present decision circuit 118, in response, supplies a first bit value on line 122 of "0" if both the second and third bit value are "1" values. If only one of the second and third bit values is a "1" value, or if both the second and third bit values are a "0", a first bit value of "1" is supplied on line 122.

The multi-threshold circuit further includes a fourth comparator 134 having an input on line 104 to accept the NRZ data stream, an input on line 106d establishing a fourth threshold (V1'), and an output on line 108d to supply a signal distinguishing when the NRZ data stream input has a high probability of being a "1" bit value. This signal is a third bit estimate. A fifth comparator 136 has an input on line 104 to accept the NRZ data stream, an input on line 106e establishing a fifth threshold (V0'), and an output on line 108e to supply a signal distinguishing when the NRZ data stream input has a high probability of being a "0" bit value. This signal is another third bit estimate.

When the multi-threshold circuit 102 supplies a third bit estimate for an NRZ data stream input on line 104 above the fifth threshold on line 106e (V0') and below the fourth threshold on line 106d (V1'), the future decision circuit 114 distinguishes NRZ data stream inputs as a "0" if the prior third bit value was a "1", and as a "1" if the prior third bit value was a "0". NRZ data above the fourth threshold is considered a definite "1", while data below the fifth threshold is considered a definite "0".

Returning to FIG. 3, in some aspects of the system 100, the multi-threshold circuit 102 accepts an NRZ data stream encoded with forward error correction (FEC). Then, the system 100 may further comprise a forward error correction (FEC) circuit 150 having an input on line 122 to receive the first bit value from the non-causal circuit 110. The FEC circuit 150 decodes the incoming data stream on line 122 to supply corrected bit values at an output on line 152. A statistics calculator 154 has an input connected to the FEC circuit output on line 152 to supply threshold values on lines 106 to the multi-threshold circuit 102 in response to the FEC corrections.

The statistics calculator 154 evaluates the number of errors associated with a plurality of three-bit sequence combinations, where each sequence includes the second bit value, followed by the first (center) bit value, followed by the third bit value. These sequence combinations are analyzed when the error is in the first (center) bit value. The statistics calculator 154 adjusts the thresholds on lines 106 in response to comparing the number of errors between different groups of three-bit sequences.

For example, the statistics calculator adjusts the thresholds to balance the number of errors between a first group of three-bit sequences and a second group of three-bit sequences. Examples of three-bit sequences, and the type of error analysis that can be performed with such an analysis is provided in greater detail in copending patent application SYSTEM AND METHOD FOR NON-CAUSAL CHANNEL EQUALIZATION USING ERROR STATISTIC DRIVEN THRESHOLDS, which is incorporated herein by reference. Likewise details are provided as to how such analysis can be used to adjust the first (V1), second (V0), and third (Vopt) thresholds.

In some aspects, the statistics calculator 154 compares different groups of three-bit sequences, where the first (center) bit value has been FEC corrected. In other aspects, the statistics calculator 154 compares different groups of three-bit sequences, where the first (center) and second bit values have been FEC corrected. Alternately, the statistics calculator 154 compares different groups of three-bit sequences, where the first (center) and third bit values have been FEC corrected.

The statistics calculator 154 typically supplies the fourth threshold (V1') on line 106d approximately midway between the first and third thresholds, and supplies the fifth threshold on line 106e (V0') approximately midway between the third and second thresholds. However, the fourth and fifth thresholds could also be set in response to a more complex analysis of the first, second, and third threshold, or in response to an analysis of third bit value errors.

FIG. 3 also illustrates an alternate aspect of the present invention system where an averaging circuit is used. Then, the system 100 further comprises an averaging circuit 160 having an input connected to the output of the non-causal circuit 110 on line 122 and an input on line 104 to accept the NRZ data stream. The averaging circuit 160 tracks the NRZ data stream inputs on line 104 when the second and third bit values both equal "1" and maintains a first long-term average of the tracked NRZ data stream inputs. The averaging circuit 160 has an output on line 106a to supply the first threshold (V1) responsive to the first long-term average.

Likewise, the averaging circuit 160 tracks the NRZ data stream inputs on line 104 when the second and third bit values both equal "0", maintains a second long-term average of the NRZ data stream inputs. The averaging circuit 160 supplies the second threshold (V0) on line 106b responsive to the second long-term average. In some aspects, the averaging circuit 160 supplies the third threshold (Vopt) on line 106c responsive to the first and second thresholds. For example, the averaging circuit 160 can supply the third threshold to be approximately midway between the first and second thresholds. Alternately, the averaging circuit 160 measures the overall average voltage of the NRZ data stream on line 128 and supplies the third threshold (Vopt) at an output on line 106c in response to the measured overall average. Examples of using the above-mentioned averaging technique to adjust the first, second, and third thresholds are provided in greater detail in copending patent application SYSTEM AND METHOD FOR NON-CAUSAL CHANNEL EQUALIZATION IN AN ASYMMETRICAL NOISE ENVIRONMENT, which is incorporated herein by reference.

The averaging circuit supplies the fourth threshold on line 106d (V1') approximately midway between the first and third thresholds, and supplies the fifth threshold on line 106*e* (V0') approximately midway between the third and second thresholds.

FIG. 5 is truth table associated with the non-causal circuit 110 of FIG. 3.

Figure 6:
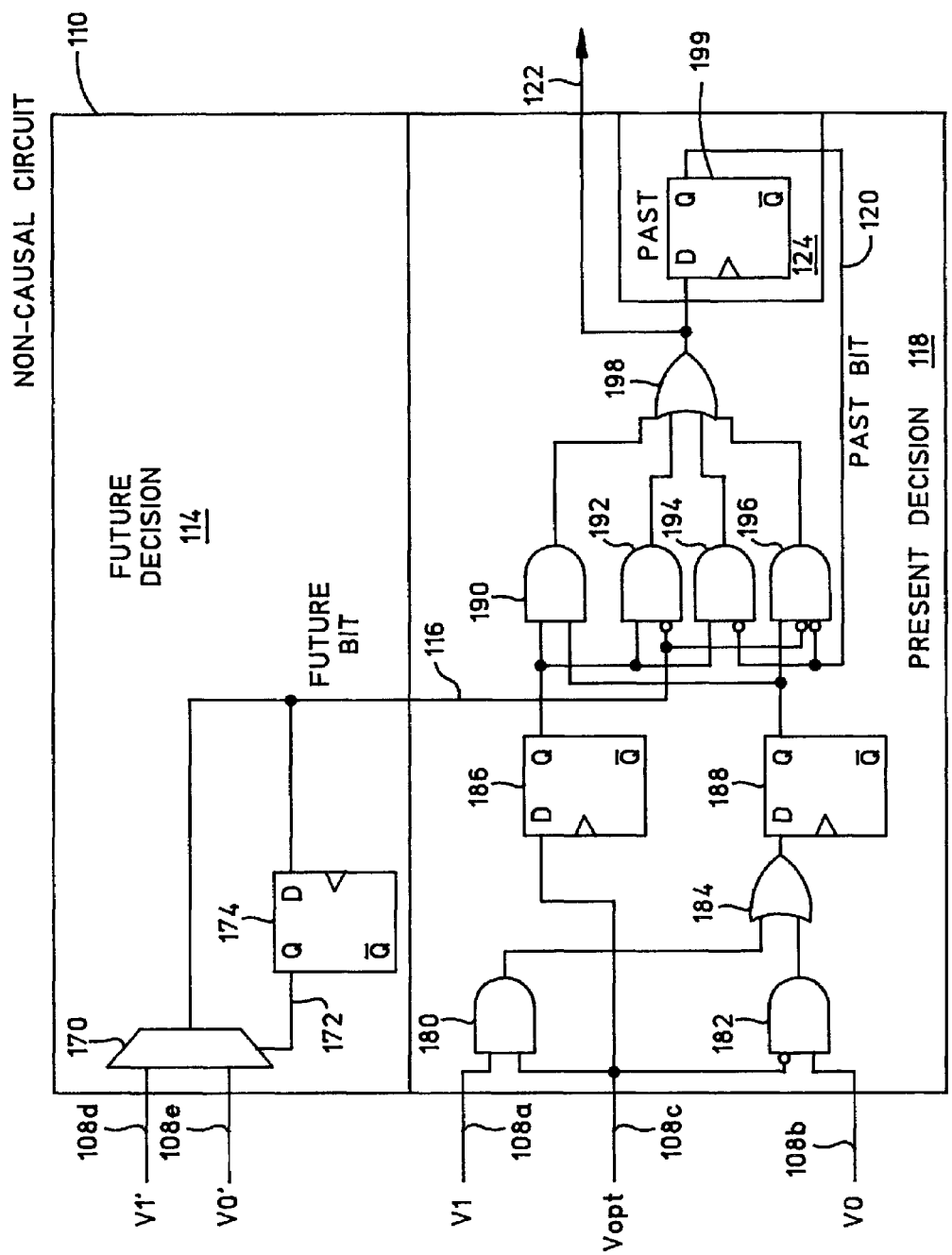
FIG. 6 is a schematic diagram illustrating the non-causal circuit of FIG. 3 in greater detail.

FIG. 6 is a schematic diagram illustrating the non-causal circuit 100 of FIG. 3 in greater detail. FIG. 6 represents only one of many designs that can be used to embody the invention. The future decision circuit 114 includes a multiplexer (MUX) 170 having a signal input connected to the output of the fourth comparator on line 108*d*, a signal input connected to the output of the fifth comparator on line 108*e*, a control input on line 172, and an output on line 116 to supply the third bit value. A flip-flop 174, such as a D flip-flop, has an input connected to the MUX output on line 116 and an output connected to the MUX control input on line 172.

The present decision circuit 118 has inputs connected to the outputs of the first, second, and third comparators of the multi-threshold circuit on lines 108*a*, 108*b*, and 108*c*, respectively. These three lines correspond to the thresholds shown in FIG. 5. The present decision circuit 114 passes the third comparator signal through on line 108*c*. The present decision circuit 118 performs AND and OR operations using AND circuit 180, AND circuit 182, and OR circuit 184. Delays of one clock cycle are added using flip-flops 186 and 188.

A slightly different variation of the present decision circuit was introduced in copending patent application SYSTEM AND METHOD FOR NON-CAUSAL CHANNEL EQUALIZATION, which is incorporated herein by reference. In this other version AND gates 180 and 182, OR gate 184, and flip-flops 186 and 188 are recited as being in the future circuit. In this previous version, the future circuit provides first bit estimates to the present decision circuit along with the third bit value. The same functionality can be achieved in the present invention by moving elements 180 through 188 into the present decision circuit.

Also shown are AND gates 190, 192, 194, and 196, as well as OR gate 198. This circuit is described in greater detail in copending patent application SYSTEM AND METHOD FOR TEMPORAL ANALYSIS OF SERIAL DATA, which is incorporated herein by reference.

The past decision circuit 116 delays the first bit value on line 122 one clock cycle to supply the second bit value on line 118. Again, a D flip-flop 199 is used for the delay.

The present decision circuit 112 supplies a first bit value by comparing the first bit estimate to situations when the second and third bit decision values are both "1", when the second and third bit value decisions are both "0", and when only one of the second and third bit value decisions is a "1". To accomplish these above-stated goals, a specific circuit implementation of AND and OR gates are shown. Alternate circuit designs can accomplish the same functions. More important is the relationship between the signal inputs and signal outputs.

Functional Description

Returning to FIG. 3, in some aspects of the system, the NRZ input signal is buffered (not shown). The NRZ data signal is provided to the multiple threshold comparators. In some aspects of the system, a timing recovery circuit (not shown) is used at the output of the comparators. The timing recovery circuit generates a clock and sample signal from the received data. The sample signal is synchronized to the center of the data bit. In this implementation, a method for offsetting the sample point is provided to compensate device or channel specific anomalies.

Figure 7A:
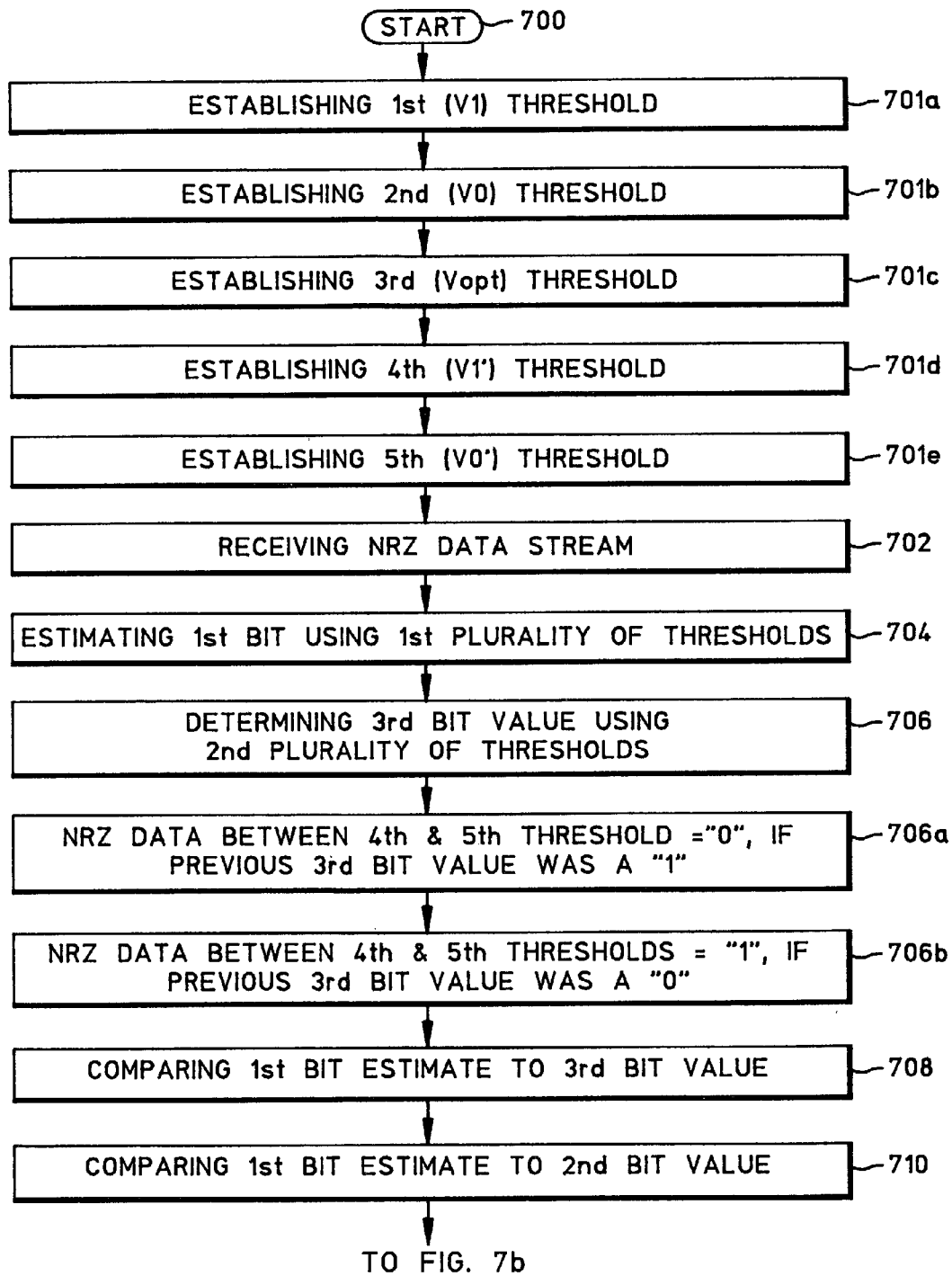
FIGS. 7a, 7b, and 7c are flowcharts illustrating the present invention method for feed-forward/feedback non-causal channel equalization.
Figure 7B:
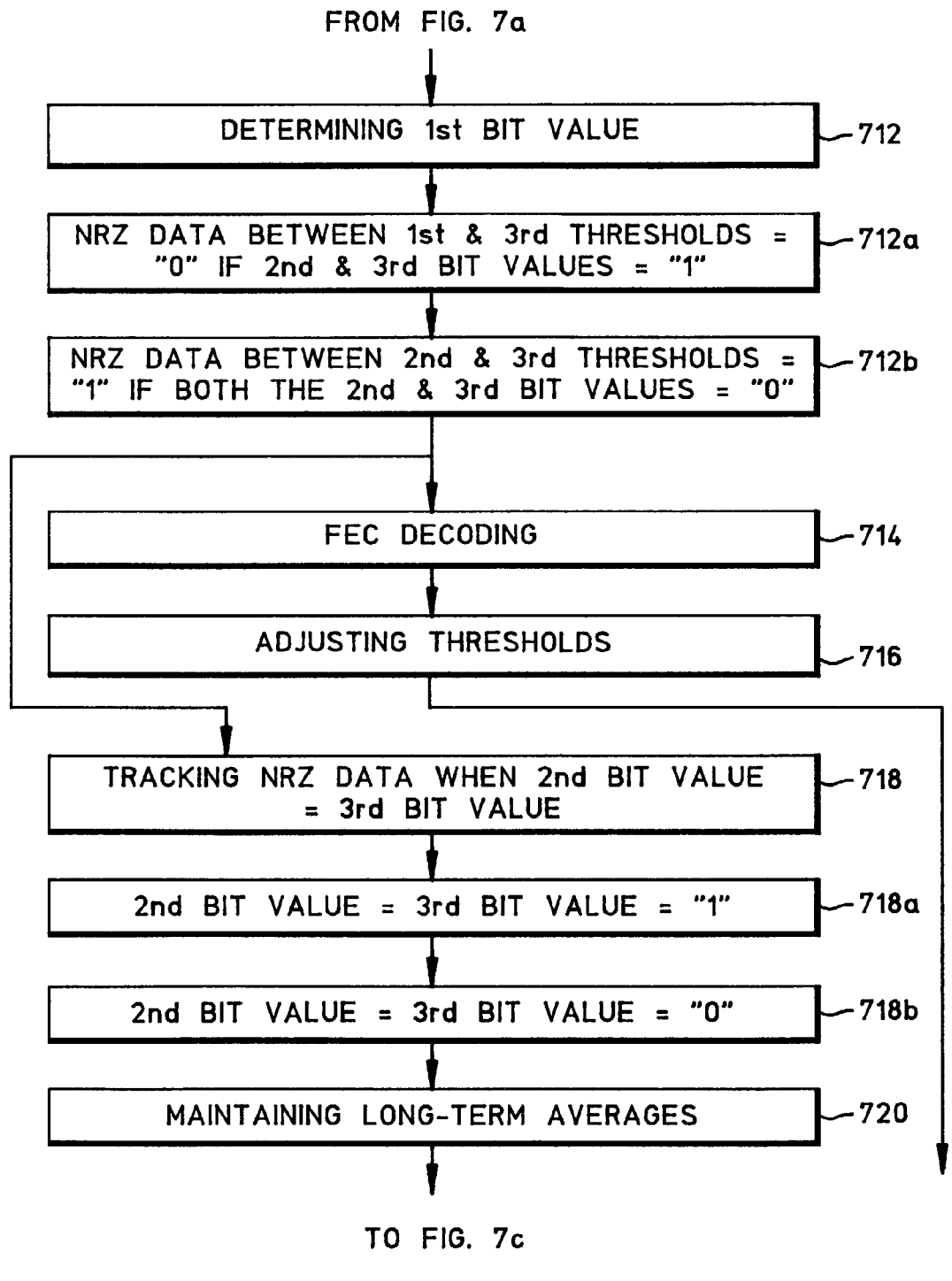
Figure 7C:
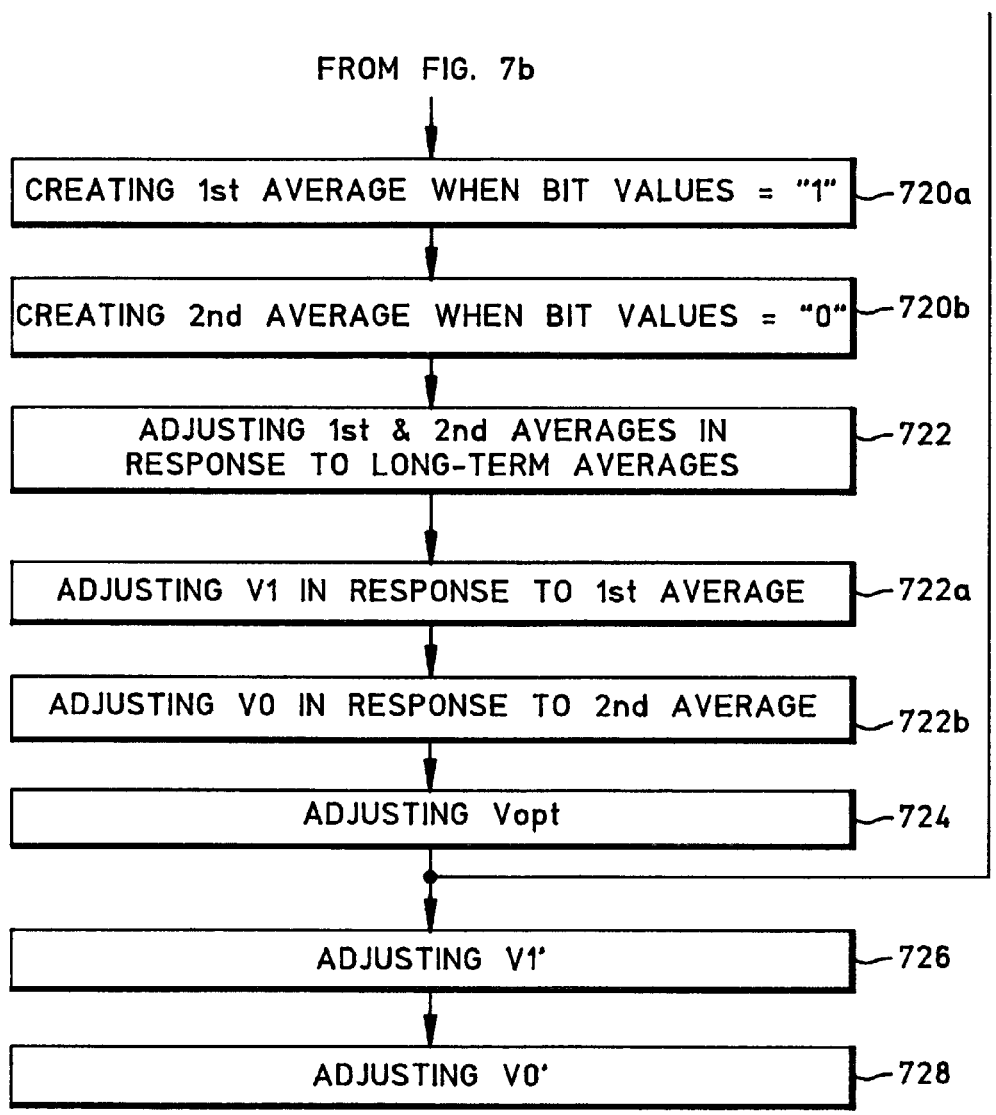

FIGS. 7*a*, 7*b*, and 7*c* are flowcharts illustrating the present invention method for feed-forward/feedback non-causal channel equalization. This method generally corresponds to FIG. 3. Although the method (and the methods of FIGS. 8 and 9 below) is depicted as a sequence of numbered steps for clarity, no order should be inferred from the numbering unless explicitly stated. It should be understood that some of these steps may be skipped, performed in parallel, or performed without the requirement of maintaining a strict order of sequence.

The method starts at Step 700. Step 702 receives a non-return to zero (NRZ) data stream input. In some aspects, the data is pseudorandom binary serial data. Step 704, using a first plurality of thresholds, estimates a first bit in the data stream. Step 706, using a second plurality of thresholds, determines a third bit value received subsequent to the first bit. Step 708 compares the first bit estimate to the third bit value. Step 710 compares the first bit estimate to a second bit value received prior to the first bit. Step 712, in response to the comparisons, determines the value of the first bit.

In some aspects of the method, estimating a first bit in the data stream using a first plurality of thresholds in Step 704 includes using three thresholds. In other aspects, determining a third bit value received subsequent to the first bit using a second plurality of thresholds in Step 706 includes using two thresholds. In some aspects, the third bit value is determined in response to a prior third bit value determination.

In some aspects, Step 701*a* establishes a first threshold (V1) to distinguish a high probability "1" first bit estimate. Step 701*b* establishes a second threshold (V0) to distinguish a high probability "0" first bit estimate. Step 701*c* establishes a third threshold (Vopt) to distinguish first bit estimates between the first and second thresholds. Then, estimating a first bit in the data stream using a first plurality of thresholds in Step 704 includes using the first, second, and third thresholds.

In some aspects, Step 701*d* establishes a fourth threshold (V1') to distinguish a high probability "1" third bit estimate. Step 701*e* establishes a fifth threshold (V0') to distinguish a high probability "0" third bit estimate. Then, determining a third bit value in Step 706 includes using the fourth and fifth thresholds.

In some aspects, determining the value of the first bit in response to the comparisons (Step 712) includes substeps. Step 712*a* distinguishes NRZ data stream inputs below first threshold and above the third threshold as a "0" if both the second and third bits are "1" values, as a "1" if only one of the second and third bits is a "1" value, and as "1" if both the second and third bits are a "0" value. Step 712*b* distinguishes NRZ data stream inputs above the second threshold and below the third threshold as a "1" if both the second and third bits are a "0" value, as a "0" if only one of the second and third values is a "0" value, and as a "0" if both the second and third bits are a "1" value.

In some aspects, determining a third bit value in Step 706 includes substeps. Step 706*a* distinguishes NRZ data stream inputs below fourth threshold and above the fifth threshold as a "0" if the prior third bit value was a "1". Step 706*b* distinguishes NRZ data stream inputs below the fourth threshold and above the fifth threshold as a "1" if the prior third bit value was a "0".

In some aspects of the method, receiving a non-return to zero data stream in Step 702 includes receiving a non-return to zero data stream encoded with forward error correction (FEC). Then, the method may comprise further steps. Step 714, following the determination of the first bit values, FEC decodes the first bit values. Step 716 uses the FEC corrections of the first bit values to adjust the threshold values. In some aspects, the first, second, and third threshold values are adjusted using FEC error statistics to adjust the thresholds.

Using FEC error statistics to adjust the thresholds in Step 716 includes evaluating the number of errors associated with a plurality of three-bit sequence combinations, where each sequence includes the second bit value, followed by the first (center) bit value, followed by the third bit value, and the error is in the first (center) bit value. In some aspects, evaluating the number of errors associated with a plurality of three-bit sequence combinations includes comparing the number of errors between different groups of three-bit sequences. For example, FEC error statistics adjust the thresholds to balance the number of errors between a first group of three-bit sequences and a second group of three-bit sequences. More specifically, evaluating the number of errors associated with a plurality of three-bit sequence combinations includes comparing different groups of three-bit sequences, where the first (center) bit value has been FEC corrected. In one aspect, different groups of three-bit sequences are compared, where the first (center) and second bit values have been FEC corrected. In other aspects, different groups of three-bit sequences are compared, where the first (center) and third bit values have been FEC corrected.

Alternately, instead of Steps 714 and 716, Step 718 tracks the NRZ data stream inputs when the second bit value equals the third bit value. Step 720 maintains long-term averages of the tracked NRZ data stream inputs. Step 722 adjusts the first and second thresholds in response to the long-term averages.

In some aspects, tracking the NRZ data stream inputs when the second bit value equals the third bit value in Step 718 includes substeps. Step 718a tracks the NRZ data stream inputs when the second and third bits both have "1" values and Step 718b tracks the NRZ data stream inputs the second and third bits have "0" values.

In some aspects, maintaining long-term averages of the NRZ data stream inputs in Step 720 includes substeps. Step 720a creates a first average of the NRZ data stream inputs when the second and third bits are both "1" values. Step 720b creates a second average of the NRZ data stream inputs when the second and third bits are both "0" values.

Adjusting the first and second thresholds in response to the long-term averages in Step 722 can also include substeps. Step 722a adjusts the first threshold (V1) in response to the first average. Step 722b adjusts the second threshold (V0) in response to the second average.

Step 724 adjusts the third threshold (Vopt) in response to adjusting the first (V1) and second (V0) thresholds. In some aspects, adjusting the third threshold (Vopt) in response to adjusting the first (V1) and second (V0) thresholds includes setting the third threshold approximately midway between the first and second thresholds.

Alternately but not shown, Step 724a measures the overall average NRZ data stream input voltage. Step 724b (not shown) sets the third threshold in response to the measured overall average.

Step 726 adjusts the fourth threshold to be approximately midway between the first and third thresholds. Step 728 adjusts the fifth threshold to be approximately midway between the third and second thresholds. In other aspects, the fourth and fifth thresholds are adjusted in response to a more complex analysis of the first, second, and third thresholds. Other methods of adjusting the fourth and fifth thresholds can be used that only involve an of third bit value errors.

Figure 8:
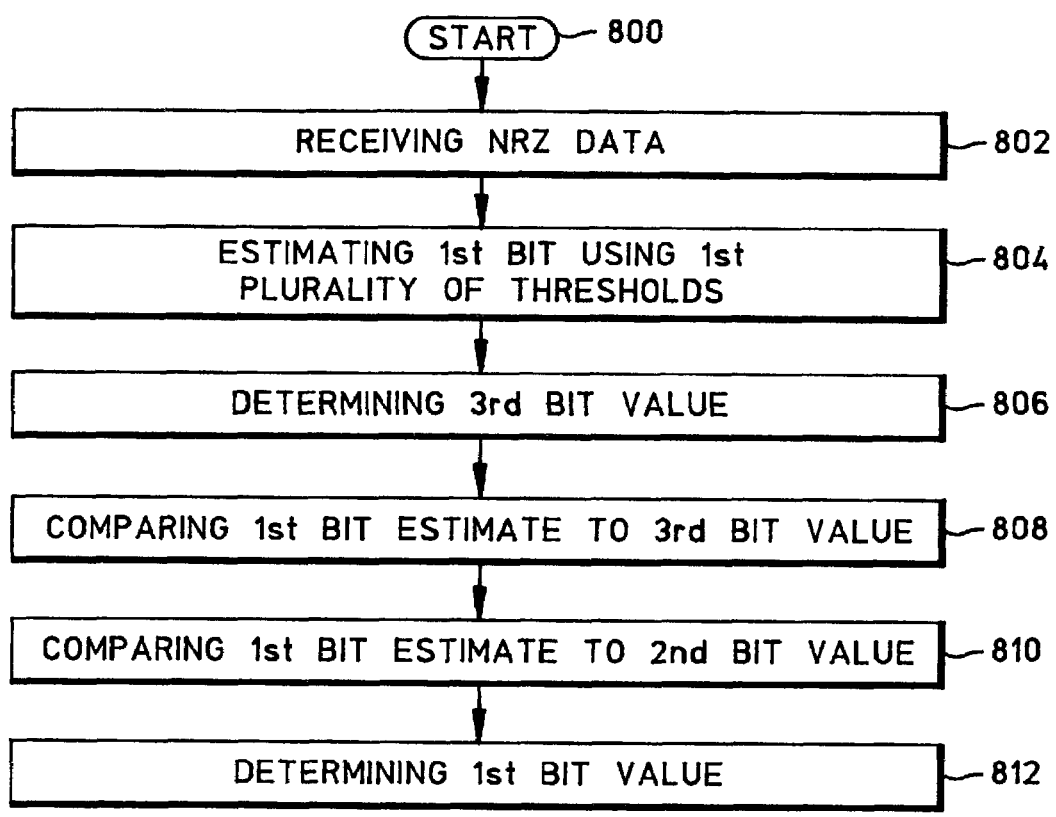
FIG. 8 is a flowchart illustrating another aspect of the present invention method for feed-forward/feedback non-causal channel equalization in a communications system.

FIG. 8 is a flowchart illustrating another aspect of the present invention method for feed-forward/feedback non-causal channel equalization in a communications system. The method starts at Step 800. Step 802 receives a non-return to zero (NRZ) data stream input. Step 804, using a first plurality of thresholds, estimates a first bit in the data stream. Step 806 determines a third bit value, received subsequent to the first bit, in response to a prior third bit value determination. Step 808 compares the first bit estimate to the third bit value. Step 810 compares the first bit estimate to a second bit value received prior to the first bit. Step 812, in response to the comparisons, determines the value of the first bit. In some aspects of the method, determining a third bit value in Step 806 includes determining the third bit value using a second plurality of thresholds.

Figure 9:
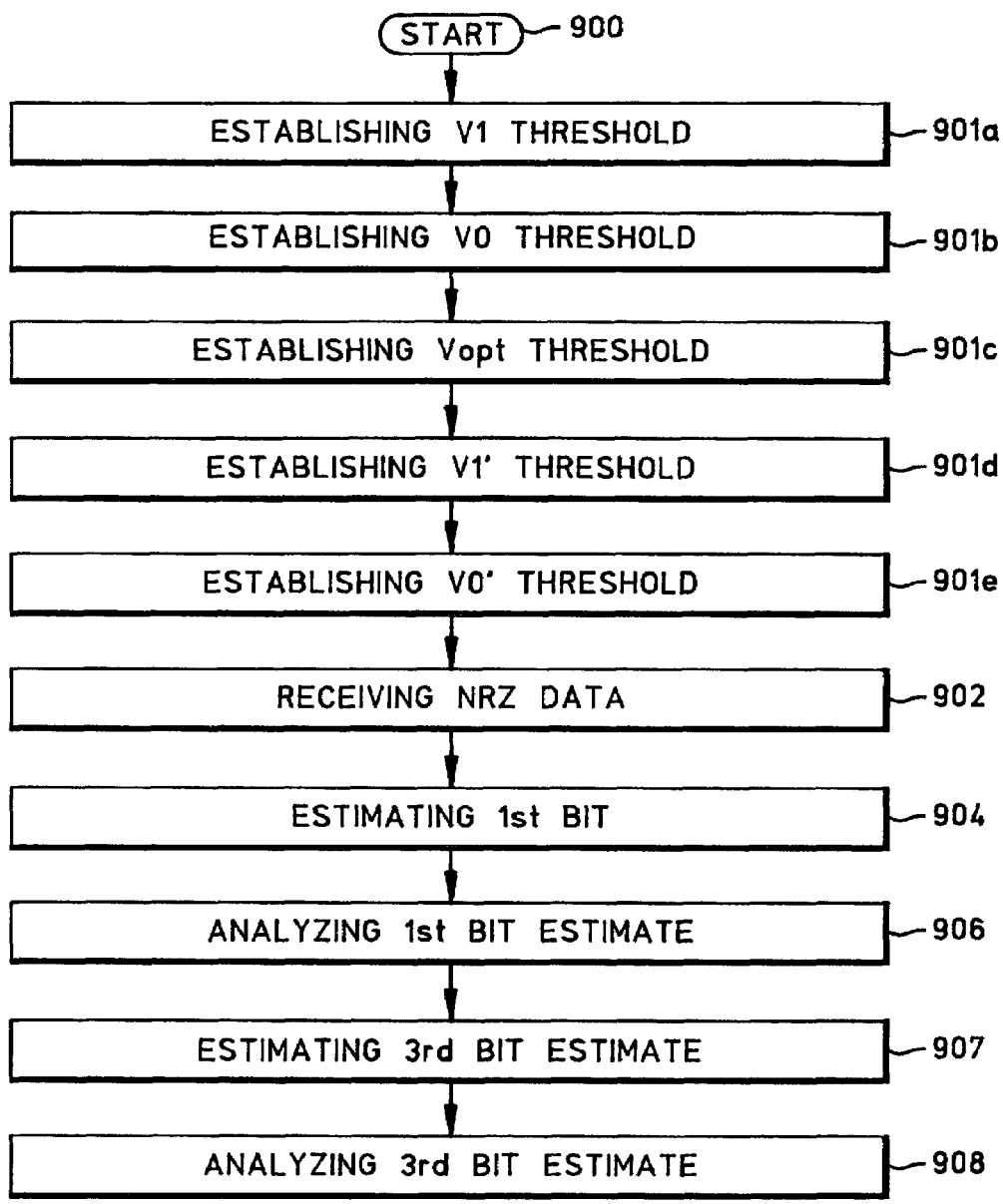
FIG. 9 is a flowchart illustrating another variation of the present invention method for feed-forward/feedback non-causal channel equalization.

FIG. 9 is a flowchart illustrating another variation of the present invention method for feed-forward/feedback non-causal channel equalization. The method starts at Step 900. Step 902 receives a non-return to zero (NRZ) data stream input. Step 904, using a first plurality of thresholds, estimates a first bit in the data stream. Step 906 analyzes the first bit estimate in a first sequence of bits to determine the first bit value. Step 908 analyzes a third bit estimate, received subsequent to the first bit, in a second sequence of bits to determine the third bit value.

In some aspects of the method, estimating a first bit in the data stream using a first plurality of thresholds in Step 904 includes estimating the first bit value with respect to three thresholds. In some aspects, analyzing the first bit estimate in a first sequence of bits to determine the first bit value in Step 906 includes analyzing a sequence of a second bit, followed by a subsequently received first bit, followed by a subsequently received third bit.

In other aspects, analyzing the third bit estimate in a second sequence of bits to determine the third bit value in Step 908 includes analyzing a sequence with a prior third bit value followed by the third bit estimate.

In some aspects a further step, Step 907, estimates a third bit value using a second plurality of thresholds. Estimating a third bit value using a second plurality of thresholds may include estimating the third bit value with respect to two thresholds.

Some aspects of the method include additional steps. Step 901a establishes a first threshold (V1) to distinguish a high probability "1" first bit estimate. Step 901b establishes a second threshold (V0) to distinguish a high probability "0" first bit estimate. Step 901c establishes a third threshold (Vopt) to distinguish first bit estimates between the first and second thresholds. Then, analyzing the first bit estimate in a first sequence of bits to determine the first bit value in 906 includes substeps (not shown). Step 906a distinguishes NRZ data stream inputs below first threshold and above the third threshold as a "0" if both the second and third bits are "1" values, as a "1" if only one of the second and third bits is a "1" value, and as "1" if both the second and third bits are a "0" value. Step 906b distinguishes NRZ data stream inputs above the second threshold and below the third threshold as a "1" if both the second and third bits are a "0" value, as a "0" if only one of the second and third values is a "0" value, and as a "0" if both the second and third bits are a "1" value.

Step 901d establishes a fourth threshold (V1') to distinguish a high probability "1" third bit estimate. Step 901e establishes a fifth threshold (V0') to distinguish a high probability "0" third bit estimate. Then, analyzing a third bit estimate in a second sequence of bits to determine the third bit value in 908 includes substeps (not shown). Step 908a distinguishes NRZ data stream inputs below fourth threshold and above the fifth threshold as a "0" if the prior third bit value was a "1". Step 908b distinguishes NRZ data stream inputs below the fourth threshold and above the fifth threshold as a "1" if the prior third bit value was a "0".

A system and method have been provided for non-causally adjusting a NRZ data stream channel. Because inter-symbol dispersion is a non-causal impairment, the estimation algorithms are more effective when based upon iteratively collected data. The degree of iteration affects the performance of the circuit and is selected based upon the implementation tradeoffs. It is expected that those skilled in the art could implement the collection of such data. Although exemplary analysis algorithms using only the preceding and subsequent bits have been explicitly described, the present invention would obviously apply to algorithms using one than one preceding or subsequent bit value. Although only NRZ data streams are explicitly discussed, it would understood by one skilled in the art that the present invention serial data temporal analysis could be applied to other modulation formats. Further, although the invention was illustrated using a three-level comparison to make present bit estimates, and a two-level comparison to make future bit determinations, the invention is not limited to any particular number of comparator levels for either process. Other embodiments and variations of the invention will occur to those skilled in the art.

We claim:

1. In a communications system, a method for feed-forward/feedback non-causal channel equalization, the method comprising:
   receiving a non-return to zero (NRZ) data stream input;
   using a first plurality of thresholds, estimating a first bit in the data stream;
   using a second plurality of thresholds, determining a third bit value received subsequent to the first bit, in response to a prior third bit value determination;
   comparing the first bit estimate to the third bit value;
   comparing the first bit estimate to a second bit value received prior to the first bit; and,
   in response to the comparisons, determining the value of the first bit.

2. The method of claim 1 wherein estimating a first bit in the data stream using a first plurality of thresholds includes using three thresholds.

3. The method of claim 1 wherein determining a third bit value received subsequent to the first bit using a second plurality of thresholds includes using two thresholds.

4. The method of claim 1 further comprising:
   establishing a first threshold (V1) to distinguish a high probability "1" first bit estimate;
   establishing a second threshold (V0) to distinguish a high probability "0" first bit estimate;
   establishing a third threshold (Vopt) to distinguish first bit estimates between the first and second thresholds; and,
   wherein estimating a first bit in the data stream using a first plurality of thresholds includes using the first, second, and third thresholds.

5. The method of claim 4 further comprising:
   establishing a fourth threshold (V1') to distinguish a high probability "1" third bit estimate;
   establishing a fifth threshold (V0') to distinguish a high probability "0" third bit estimate; and,
   wherein determining a third bit value includes using the fourth and fifth thresholds.

6. The method of claim 5 wherein determining the value of the first bit in response to the comparisons includes:
   distinguishing NRZ data stream inputs below first threshold and above the third threshold as a "0" if both the second and third bits are "1" values, as a "1" if only one of the second and third bits is a "1" value, and as "1" if both the second and third bits are a "0" value; and,
   distinguishing NRZ data stream inputs above the second threshold and below the third threshold as a "1" if both the second and third bits are a "0" value, as a "0" if only one of the second and third values is a "0" value, and as a "0" if both the second and third bits are a "1" value.

7. The method of claim 6 wherein determining a third bit value includes:
   distinguishing NRZ data stream inputs below fourth threshold and above the fifth tbreshold as a "0" if the prior third bit value was a "1"; and,
   distinguishing NRZ data stream inputs below the fourth threshold and above the fifth threshold as a "1" if the prior third bit value was a "0".

8. The method of claim 7 wherein receiving a non-return to zero data stream includes receiving a non-return to zero data stream encoded with forward error correction (FEC);
   the method further comprising:
   following the determination of the first bit values, FEC decoding the first bit values; and,
   using the FEC corrections of the first bit values to adjust the threshold values.

9. The method of claim 8 wherein using the FEC corrections of the first bit values to adjust the first, second, and third threshold values includes using FEC error statistics to adjust the thresholds.

10. The method of claim 9 wherein using FEC error statistics to adjust the thresholds includes evaluating the number of errors associated with a plurality of three-bit sequence combinations, where each sequence includes the second bit value, followed by the first (center) bit value, followed by the third bit value, and the error is in the first (center) bit value.

11. The method of claim 10 wherein evaluating the number of errors associated with a plurality of three-bit sequence combinations includes comparing the number of errors between different groups of three-bit sequences.

12. The method of claim 11 wherein using FEC error statistics to adjust the thresholds includes adjusting the thresholds to balance the number of errors between a first group of three-bit sequences and a second group of three-bit sequences.

13. The method of claim 11 wherein evaluating the number of errors associated with a plurality of three-bit sequence combinations includes comparing different groups of three-bit sequences, where the first (center) bit value has been FEC corrected.

14. The method of claim 11 wherein evaluating the number of errors associated with a plurality of three-bit sequence combinations includes comparing different groups of three-bit sequences, where the first (center) and second bit values have been FEC corrected.

15. The method of claim 11 wherein evaluating the number of errors associated with a plurality of three-bit sequence combinations includes comparing different groups of three-bit sequences, where the first (center) and third bit values have been FEC corrected.

16. The method of claim 7 farther comprising:
   tracking the NRZ data stream inputs when the second bit value equals the third bit value;

maintaining long-term averages of the tracked NRZ data stream inputs; and, adjusting the first and second thresholds in response to the long-term averages.

17. The method of claim 16 wherein tracking the NRZ data stream inputs when the second bit value equals the third bit value includes:

tracking the NRZ data stream inputs when the second and third bits both have "1" values; and, tracking the NRZ data stream inputs the second and third bits have "0" values.

18. The method of claim 17 wherein maintaining long-term averages of the MRZ data stream inputs includes:

creating a first average of the NRZ data stream inputs when the second and third bits are both "1" values; and, creating a second average of the NRZ data stream inputs when the second and third bits are both "0" values.

19. The method of claim 18 wherein adjusting the first and second thresholds in response to the long-term averages includes:

adjusting the first threshold (V1) in response to the first average; and, adjusting the second threshold (V0) in response to the second average.

20. The method of claim 19 further comprising:

adjusting the third threshold (Vopt) in response to adjusting the first (V1) and second (V0) thresholds.

21. The method of claim 20 wherein adjusting the third threshold (Vopt) in response to adjusting the first (V1) and second (V0) thresholds includes setting the third threshold approximately midway between the first and second thresholds.

22. The method of claim 16 further comprising:

measuring the overall average NRZ data stream input voltage; and, setting the third threshold in response to the measured overall average.

23. The method of claim 7 further comprising:

adjusting the fourth threshold to be approximately midway between the first and third thresholds; and, adjusting the fifth threshold to be approximately midway between the third and second thresholds.

24. In a communications system, a method for feed-forward/feedback non-causal channel equalization, the method comprising:

receiving a non-return to zero (NRZ) data stream input;

using a first plurality of thresholds, estimating a first bit in the data stream;

analyzing the first bit estimate in a first sequence of bits to determine the first bit value;

analyzing a third bit estimate, received subsequent to the first bit, in a second sequence of bits to determine the third bit value; and, wherein analyzing the first bit estimate in a first sequence of bits to determine the first bit value includes analyzing a sequence of a second bit, followed by a subsequently received first bit, followed by a subsequently received third bit.

25. The method of claim 24 wherein estimating a first bit in the data stream using a first plurality of thresholds includes estimating the first bit value with respect to three thresholds.

26. The method of claim 24 wherein analyzing the third bit estimate in a second sequence of bits to determine the third bit value includes analyzing a sequence with a prior third bit value followed by the third bit estimate.

27. The method of claim 24 further comprising:

using a second plurality of thresholds, estimating a third bit value.

28. The method of claim 27 wherein estimating a third bit value using a second plurality of thresholds includes estimating the third bit value with respect to two thresholds.

29. The method of claim 24 further comprising:

establishing a first threshold (V1) to distinguish a high probability "1" first bit estimate;

establishing a second threshold (V0) to distinguish a high probability "0" first bit estimate;

establishing a third threshold (Vopt) to distinguish first bit estimates between the first and second thresholds; and, wherein analyzing the first bit estimate in a first sequence of bits to determine the first bit value includes:

distinguishing NRZ data stream inputs below first threshold and above the third threshold as a "0" if both the second and third bits are "1" values, as a "1" if only one of the second and third bits is a "1" value, and as "1" if both the second and third bits are a "0" value; and, distinguishing NRZ data stream inputs above the second threshold and below the third threshold as a "1" if both the second and third bits are a "0" value, as a "0" if only one of the second and third values is a "0" value, and as a "0" if both the second and third bits are a "1" value.

30. The method of claim 29 further comprising:

establishing a fourth threshold (V1') to distinguish a high probability "1" third bit estimate;

establishing a fifth threshold (V0') to distinguish a high probability "0" third bit estimate; and, wherein analyzing a third bit estimate in a second sequence of bits to determine the third bit value includes:

distinguishing NRZ data stream inputs below fourth threshold and above the fifth threshold as a "0" if the prior third bit value was a "1"; and, distinguishing NRZ data stream inputs below the fourth threshold and above the fifth threshold as a "1" if the prior third bit value was a "0".

31. A feed-forward/feedback non-causal channel equalization communication system, the system comprising:

a multi-threshold circuit having an input to accept a non-return to zero (NRZ) data stream, an input to accept threshold values, and outputs to provide first bit estimates responsive to a first plurality of voltage threshold levels, and third bit estimates in response to a second plurality of voltage threshold levels;

a non-causal circuit having inputs to accept bit estimates from the multi-threshold circuit, the non-causal circuit having an output to supply a first bit value responsive to comparing first bit estimates to a third bit value, received subsequent to the first bit and determined in response to a previously determined third bit value, and a second bit value received prior to the first bit; and, wherein the non-causal circuit includes:

a future decision circuit having inputs connected to the mutli-threshold circuit outputs to accept the third bit estimates and an output to supply a third bit value responsive to prior third bit value determinations;

a present decision circuit having inputs to accept the first bit estimates from the multi-threshold circuit, the third bit value from the future decision circuit, and a second bit value, the present decision circuit having an output to supply the first bit value determined in response to comparing the first bit estimates to the second and third bit values; and, a past decision circuit having an input to accept the first bit value and an output to supply the second bit value.

32. The system of claim 31 wherein the multi-threshold circuit includes:
   a first comparator having an input to accept the NRZ data stream, an input establishing a first threshold (V1), and an output to supply a signal distinguishing when the NRZ data stream input has a high probability of being a "1" bit value estimate;
   a second comparator having an input to accept the NRZ data stream, an input establishing a second threshold (V0), and an output to supply a signal distinguishing when the NRZ data stream input has a high probability of being a "0" bit value estimate; and,
   a third comparator having an input to accept the NRZ data stream, an input establishing a third threshold (Vopt), and an output to provide a signal when the NRZ data stream input has an approximately equal probability of being a "0" value as a "1" value estimate.

33. The system of claim 32 wherein the multi-threshold circuit supplies a bit estimate for an NRZ data stream input below the third threshold and above the second threshold;
   wherein the present decision circuit, in response, supplies:
   a first bit value of "1" if both the second and third hit value are "0" values;
   a first bit value of "0" if only one of the second and third bit values is a "0" value; and,
   a first bit value of "0" if both the second and third bit values are a "1".

34. The system of claim 33 wherein the multi-threshold circuit supplies a bit estimate for an NRZ data stream input above the third threshold and below the first threshold;
   wherein the present decision circuit, in response, supplies:
   a first bit value of "0" if both the second and third bit value are "1" values;
   a first bit value of "1" if only one of the second and third bit values is a "1" value; and,
   a first bit value of "1" if both the second and third bit values are a "0".

35. The system of claim 34 wherein the multi-threshold circuit includes:
   a fourth comparator having an input to accept the NRZ data stream, an input establishing a fourth threshold (V1'), and an output to supply a signal distinguishing when the NRZ data stream input has a high probability of being a "1" bit value; and,
   a fifth comparator having an input to accept the NRZ data stream, an input establishing a fifth threshold (V0'), and an output to supply a signal distinguishing when the NRZ data stream input has a high probability of being a "0" bit value.

36. The system of claim 35 wherein the multi-threshold circuit supplies a third bit estimate for an NRZ data stream input above the fifth threshold and below the fourth threshold; and,
   wherein the future decision circuit distinguishes NRZ data stream inputs as a "0" if the prior third bit value was a "1", and as a "1" if the prior third bit value was a "0".

37. The system of claim 36 wherein the multi-threshold circuit accepts an NRZ data stream encoded with forward error correction (FEC); and,
the system further comprising:
   a forward error correction (FEC) circuit having an input to receive the first bit value from the non-causal circuit, the FEC circuit decoding the incoming data stream to supply corrected bit values at an output; and,
   a statistics calculator having an input connected to the FEC circuit output to supply threshold values to the multi-threshold circuit in response to the FEC corrections.

38. The system of claim 37 wherein the statistics calculator evaluates the number of errors associated with a plurality of three-bit sequence combinations, where each sequence includes the second bit value, followed by the first (center) bit value, followed by the third bit value, and the error is in the first (center) bit value.

39. The system of claim 38 wherein the statistics calculator adjusts the thresholds in response to comparing the number of errors between different groups of three-bit sequences.

40. The system of claim 39 wherein the statistics calculator adjusts the thresholds to balance the number of errors between a first group of three-bit sequences and a second group of three-bit sequences.

41. The system of claim 38 wherein the statistics calculator compares different groups of three-bit sequences, where the first (center) bit value has been FEC corrected.

42. The system of claim 38 wherein the statistics calculator compares different groups of three-bit sequences, where the first (center) and second bit values have been FEC corrected.

43. The system of claim 38 wherein the statistics calculator compares different groups of three-bit sequences, where the first (center) and third bit values have been FEC corrected.

44. The system of claim 37 wherein the statistics calculator supplies the fourth threshold approximately midway between the first and third thresholds, and supplies the fifth threshold approximately midway between the third and second thresholds.

45. The system of claim 36 further comprising:
   an averaging circuit having an input connected to the output of the non-causal circuit and an input to accept the NRZ data stream, the averaging circuit tracking the NRZ data stream inputs when the second and third bit values both equal "1" and maintaining a first long-term average of the tracked NRZ data stream inputs, the averaging circuit having an output to supply the first threshold (V1) responsive to the first long-term average.

46. The system of claim 45 wherein the averaging circuit tracks the NRZ data stream inputs when the second and third bit values both equal "0", maintains a second long-term average of the NRZ data stream inputs, and supplies the second threshold (V0) responsive to the second long-term average.

47. The system of claim 46 wherein the averaging circuit supplies the third threshold (Vopt) responsive to the first and second thresholds.

48. The system of claim 47 wherein the averaging circuit supplies the third threshold approximately midway between the first and second thresholds.

49. The system of claim 45 wherein the averaging circuit measures the overall average voltage of the NRZ data stream and supplies the third threshold (Vopt) at an output in response to the measured overall average.

50. The system of claim 45 wherein the averaging circuit supplies the fourth threshold approximately midway between the first and third thresholds, and supplies the fifth threshold approximately midway between the third and second thresholds.

51. The system of claim 36 wherein the future decision circuit includes;
   a multiplexer (MUX) having a signal input connected to the output of the fourth comparator, a signal input connected to the output of the fifth comparator, a control input, and an output to supply the third bit value; and,
   a flip-flop having an input connected to the MUX output and an output connected to the MUX control input.

* * * * *